J. H. JONES.
Hand Seeder.
No. 15,610.
Patented Aug. 26, 1856.
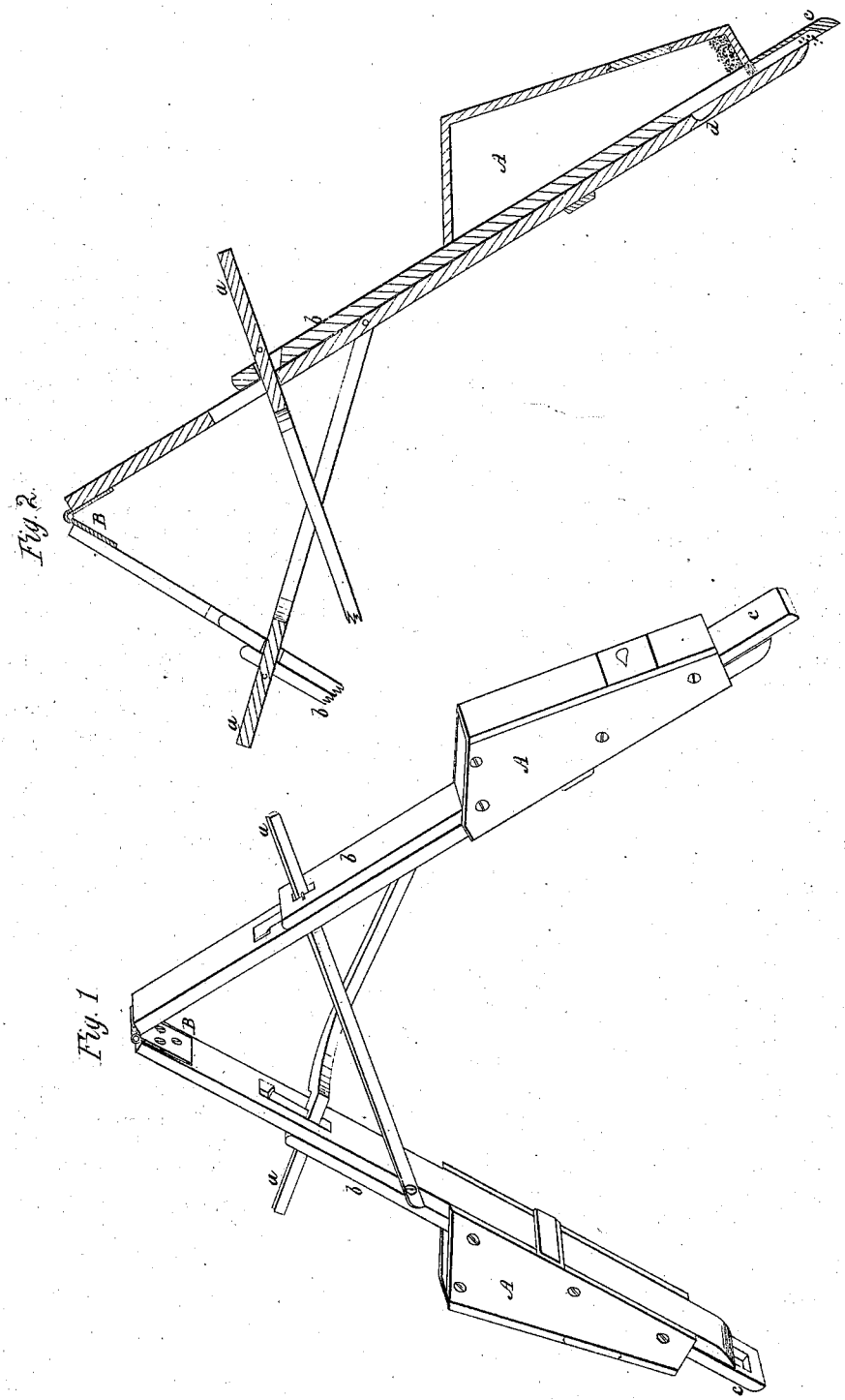

UNITED STATES PATENT OFFICE.

J. HERVA JONES, OF ROCKTON, ILLINOIS.

IMPROVEMENT IN HAND SEED-PLANTERS.

Specification forming part of Letters Patent No. 15,610, dated August 26, 1856.

*To all whom it may concern:*

Be it known that I, J. HERVA JONES, of the town of Rockton, in the county of Winnebago and State of Illinois, have invented a new and useful Machine for Planting Seeds; and I do hereby declare that the following is a clear, full, and exact description of the same, reference being had to the annexed drawings, making a part of this specification, in which—

Figure 1 is a perspective view, showing the planters with their reservoirs A A, the hinge B, the levers $a\ a$, the cap-pieces $b\ b$, to which the reservoirs are attached, and the sharp planting-points $c\ c$. Fig. 2 is a longitudinal elevation, the same letters referring to like exterior parts as in Fig. 1, showing the planter with its reservoir A, the hinge B, the levers $a\ a$, the cap-pieces $b\ b$, to which the reservoirs are attached, the planting-point $c$, and the seeding apparatus $d$.

The advantages of this machine are certainty of covering the seed by the expansion of the points and the inclination at which they enter the ground when planting, ease of adjustability of width by raising and lowering the joints of the levers, and portability by being closed entirely together like a pair of compasses when desired.

The nature of my invention consists in so hinging two single hand-planters together by a hinge or joint at their tops without the intervention of a bar or connecting-rods as that when they are struck down they will expand, and their points enter the ground at an inclination more or less, as the case may be, and also combining with the hinge or joint two levers, which serve the triple purpose—to wit, adjusting the width of the planting-points by their joints being raised or lowered, retaining the planters in their inclined position while being carried from place to place, and operating the apparatus for dropping the seed.

The full operation is as follows: The reservoirs A A, being filled with seed, take hold of the levers $a\ a$ and lift the machine from the ground, when it will assume its contracted position, the points $c\ c'$ being nearest together. The seeding-cavity will now have deposited a sufficient quantity of seed for a hill in the discharging-recess near $c$. The machine is then struck down, and the hinge B allows the points to expand and enter the ground until the bottoms of the reservoirs press the surface. This allows the shoulders of the levers to withdraw from their recesses at the top of the slots, and as the pressure of the hands continues the cap-pieces $b\ b$ become fulcrums, the lower sections of the points are withdrawn from the ground, and the seed falls into the receptacle thus made. The machine being now lifted, the lower sections of the points are returned upon the seed, the whole machine contracts, the points are withdrawn from the earth at the same inclination at which they entered, leaving the whole mass of earth above to fall upon the seed, and the same position is assumed as at first.

Such being the nature of my improvement in seed-planters, I do not claim that part which enters the ground, nor do I claim any method of selecting and dropping the seed; but

What I claim as my invention, and desire to secure by Letters Patent, is—

The use of a hinge or joint, B, or its equivalent, for connecting two single hand-planters at their tops, for the purpose of allowing them, like a pair of compasses, to expand and contract in their operation, substantially in the manner and for the purpose set forth.

In testimony whereof I hereunto set my hand before two subscribing witnesses.

J. HERVA JONES. [L. S.]

Witnesses:
W. R. WILD,
J. G. HOLDEN.